United States Patent
Burton et al.

(10) Patent No.: US 8,048,341 B2
(45) Date of Patent: *Nov. 1, 2011

(54) NANOCARBON-REINFORCED POLYMER COMPOSITE AND METHOD OF MAKING

(75) Inventors: David Burton, Waynesville, OH (US); Patrick Lake, Beavercreek, OH (US); Carla Leer R. Castro, Beavercreek, OH (US)

(73) Assignee: Applied Sciences, Inc., Cedarville, OH (US)

( * ) Notice: Subject to any disclaimer, the term of this patent is extended or adjusted under 35 U.S.C. 154(b) by 208 days.

This patent is subject to a terminal disclaimer.

(21) Appl. No.: 12/473,871

(22) Filed: May 28, 2009

(65) Prior Publication Data

US 2009/0294736 A1    Dec. 3, 2009

Related U.S. Application Data

(60) Provisional application No. 61/056,548, filed on May 28, 2008.

(51) Int. Cl.
*H01B 1/24* (2006.01)

(52) U.S. Cl. ......... 252/511; 252/502; 252/506; 977/532

(58) Field of Classification Search .................. 252/511, 252/502, 506; 977/932
See application file for complete search history.

(56) References Cited

U.S. PATENT DOCUMENTS

| | | | |
|---|---|---|---|
| 5,024,818 A | 6/1991 | Tibbetts et al. | |
| 5,837,081 A * | 11/1998 | Ting et al. | 156/89.26 |
| 6,599,446 B1 * | 7/2003 | Todt et al. | 252/511 |
| 6,752,937 B2 * | 6/2004 | Butler | 252/511 |
| 6,911,169 B2 | 6/2005 | Kwag et al. | |
| 6,942,823 B2 * | 9/2005 | Terada et al. | 252/511 |
| 2010/0055465 A1 * | 3/2010 | Palmer et al. | 428/408 |
| 2011/0102231 A1 * | 5/2011 | Matsumoto et al. | 342/1 |

* cited by examiner

*Primary Examiner* — Douglas Mc Ginty
(74) *Attorney, Agent, or Firm* — Dinsmore & Shohl LLP

(57) ABSTRACT

A method of making a polymer composite from a mixture of a polymeric material, carbon nanofibers, and nano-scale particles is provided. The carbon nanofibers are less than about 1 micrometer in diameter, and the nano-scale particles are shorter in length than the carbon nanofibers. The nano-scale particles are selected from nano-scale carbon additives, non-conductive nano-clays, nano-scale conductive metallic additives, or combinations thereof. The components are mixed to form a polymer composite. A polymer composite having a resistivity of less than about $10^7$ ohm-cm is also described.

17 Claims, 2 Drawing Sheets

US 8,048,341 B2

NANOCARBON-REINFORCED POLYMER COMPOSITE AND METHOD OF MAKING

BACKGROUND OF THE INVENTION

The present invention relates to a method of making a polymer-based composite material having improved mechanical and electrical properties, and more particularly, to a polymer composite which is reinforced with a blend of carbon nanofibers and nano-scale particles.

Many applications exist where there is a need for the enhancement of conductivity in polymer materials: for example, in static electricity dissipation, automotive applications such as electrostatic painting of panels, and electromagnetic interference (EMI) shielding applications. Typically, polymers may be reinforced with additives including talc, carbon black, milled carbon fibers, or metallic particles to improve modulus of elasticity, or electrical conductivity, or a combination of these and other physical properties. The incorporation of such additives typically has a dramatic influence on the viscosity of the polymer, and, as a consequence, on the processing characteristics of the compound when it is formed into a composite article through extrusion and molding.

The use of nanocarbon materials has been proposed to provide mechanical reinforcement to a polymeric matrix. For example, polymer composites containing carbon nanofibers dispersed in a polymeric matrix have been known to exhibit mechanical properties such as stiffness, strength and toughness, and physical properties such as coefficient of thermal expansion, electrical and thermal conductivities which are superior to those of the polymeric matrix alone. Moreover, they do so at much lower loading levels than are required to reach comparable physical property thresholds using milled carbon fibers or carbon black. As a result, the processing characteristics of the polymer compound are modified to a much lower degree than polymer compounds synthesized by incorporation of milled carbon fiber or carbon black.

Uniform dispersion of the nanomaterial into the host polymer helps to obtain the full benefit of the nanomaterial in modifying the properties of the host polymer. It has been shown that blending carbon nanofibers with larger diameter milled glass fibers has a beneficial effect in achieving a satisfactory dispersion of the nanofibers as a consequence of bi-modal mixing of two disparate geometries of material (U.S. Pat. No. 6,911,169, which is incorporated herein by reference). Such blending of two or more particle sizes may reduce the shear force expressed on nanofibers during compounding, so that the nanofibers retain a high aspect ratio and more efficiently contribute to a connected network of conductors needed to achieve electric pathways within the polymer.

One type of carbon nanofiber which has been used in polymeric composites is vapor grown carbon fibers. A method for producing vapor grown carbon nanofibers is taught in U.S. Pat. No. 5,024,818, the disclosure of which is hereby incorporated by reference. These fibers are significantly smaller than carbon fibers produced by other conventional methods. The diameter of these carbon nanofibers is typically from about 80 to 200 nm, In addition, the fibers are relatively short, with lengths ranging from about 40 to about 200 micrometers.

However, there is a significant difficulty when vapor grown carbon fibers are incorporated in a polymer matrix. A high shear bulk fabrication technique is typically used, such as, for example, a twin screw extruder. The high shearing forces of the equipment, which are designed to promote dispersion of the fibers, have a counter effect on the fiber length and network formation, destroying the interconnections between the fibers that are necessary for thermal and electrical conductivity in the composite. Such an undesirable effect is particularly evident with the use of small diameter vapor grown carbon fibers, whose high surface area and stiffness can render the fibers too fragile for many types of production mixers. The result is a composite material whose electrical resistivity is significantly higher than that desired. While higher carbon fiber contents of 5 volume percent or higher can help reduce resistivity, such composites are more difficult to process and can exhibit unacceptable mechanical properties.

Accordingly, there is a need in the art for a method of providing carbon-filled polymer-based composites having improved electrical properties and suitable mechanical properties for electrical applications.

SUMMARY OF THE INVENTION

The present invention meets that need by providing a method of making a polymer-based composite material which exhibits relatively low electrical resistivity in which graphitic carbon nanofibers are blended with nano-scale carbon additives or conductive metallic nano-scale materials having high surface area with complementary geometric and desired physical properties. Such nano-scale additives include carbon black, exfoliated carbon nanofibers, exfoliated graphite, and nano-graphene platelets, as well as non-conductive nano-clays or conductive nano-scale silver, aluminum, and other conductive metals. The resulting composite exhibits improved properties including higher transverse strength and stiffness, greater interlaminar shear strength and micro-cracking resistance, improved performance temperature, dimensional stability, and improved electrical and thermal conductivities.

According to one aspect of the present invention, a method is provided for making a polymer composite comprising providing carbon nanofibers having a diameter of less than about one micrometer; providing nano-scale particles which are shorter in length than the carbon nanofibers, the nano-scale particles selected from nano-scale carbon additives, non-conductive nano-clays, nano-scale conductive metallic additives, or combinations thereof; and mixing the carbon nanofibers and the nano-scale particles with a polymer to form the polymer composite.

Another aspect of the invention involves a polymer composite comprising: about 0.1 to about 3 wt % carbon nanofibers having a diameter of less than about one micrometer; about 1 to about 10 wt % nano-scale particles selected from nano-scale carbon additives, non-conductive nano-clays, nano-scale conductive metallic additives, or combinations thereof; and a polymer; wherein the polymer composite has a resistivity of less than about $10^7$ ohm-cm.

Other features and advantages of the invention will be apparent from the following description, the accompanying drawings, and the appended claims.

DETAILED DESCRIPTION OF THE INVENTION

We have found that the combination of carbon nanofibers with other nano-scale particles provides an economical hybrid system having many synergistic properties. For example, carbon nanofibers have a large aspect ratio while nano-graphene platelets, for example, disperse easily and are low in cost. In addition, we have found that the combination of carbon nanofibers and nano-scale particles unexpectedly provides a lower overall electrical resistivity, and a lower percolation threshold for the onset of electrical conductivity than the use of either of these materials alone at equal loadings.

The resulting polymer composite preferably has an electrical resistivity of less than about $10^7$ ohm-cm in the direction of the melt flow, or less than about $10^6$ ohm-cm, or less than about $10^5$ ohm-cm, or less than about $10^4$ ohm-cm, or less than about $10^3$ ohm-cm. The resistivity needed will depend on the application the material is being used in. For example, the resistivity should be in the range of about $10^8$ ohm-cm to about $10^6$ ohm-cm for ESD, while the resistivity should be in the range of about $10^3$ ohm-cm to about $10^0$ ohm-cm for EMI shielding.

Figure 1:
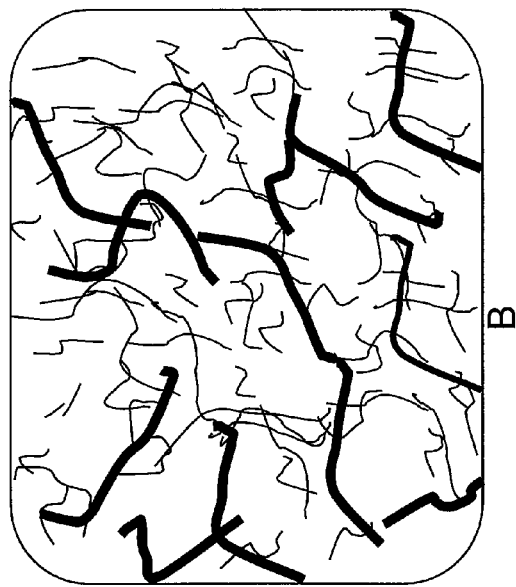
FIGS. 1A-C are illustrations of carbon nanofibers alone, carbon nanofibers with other fibers, and carbon nanofibers with nano graphene platelets, showing the ability of carbon nanofibers to provide electrical connectivity and a percolation threshold for electrical conductivity which is lower than the percolation threshold for either carbon nanofibers alone or for other single constituent additives alone.
Figure 1:
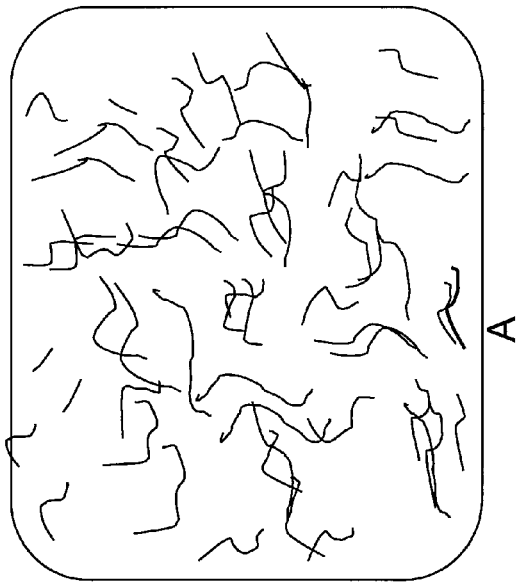
Figure 1:
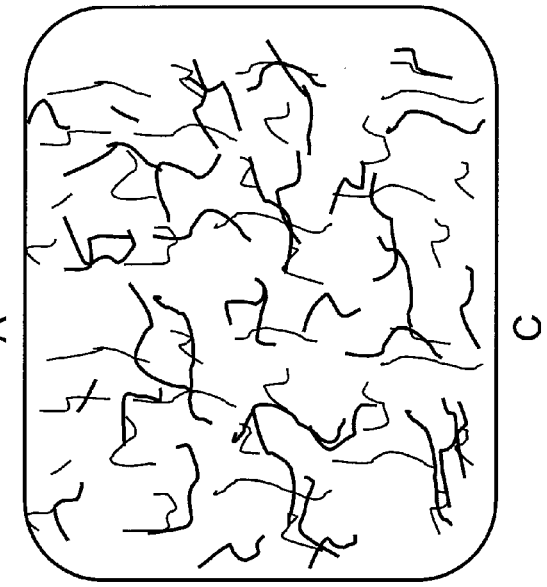

While not wishing to be bound by theory, it is believed that because the nano-scale particles have a higher specific surface area than the carbon nanofibers, the nano-scale particles substantially promote the connectivity with the carbon nanofibers within the mixture and therefore increase the number of contacts between the conductive species during the low shear molding process, as illustrated in FIGS. 1A-C. FIG. 1A shows carbon nanofibers alone, FIG. 1B shows carbon nanofibers with other fibers, and FIG. 1C shows carbon nanofibers with nano graphene platelets, showing the ability of carbon nanofibers to provide electrical connectivity and a percolation threshold for electrical conductivity which is lower than the percolation threshold for either carbon nanofibers alone or for other single constituent additives alone. Thus, for example, whereas a total loading of 3 wt % of carbon nanofibers might define the threshold to achieve conductivity, a combination of carbon nanofibers and carbon black, or a combination of carbon nanofibers and graphene platelets could show conductivity at a 1.5 wt % total loading.

The nano-scale particles include, but are not limited to, nano-scale carbon additives, non-conductive nano-clays, nano-scale conductive metallic additives, or combinations thereof. The nano-scale carbon additives include, but are not limited to, carbon black, exfoliated carbon nanofibers, exfoliated graphite, and nano-graphene platelets. Nano-scale conductive metallic additives include, but are not limited to, silver, aluminum, and other conductive metals.

The nano-scale particles have a geometry that allows them to have high surface area (e.g., greater than about 10 $m^2$ per gram.)

The nano-scale particles comprise up to about 50 wt % of the mixture, and typically about 1 to about 10 wt % of the mixture. It should be appreciated that the addition of as little as about 1 wt % of nano-graphene platelets has been shown to significantly decrease resistivity. This synergistic effect is believed to be a result of the nano-graphene platelets bridging with the nanofibers, leading to a higher number of contacts between the conductive species.

The nano graphene platelets preferably have a length which is equal to or less than about 1,000 nm and more preferably, between about 50 to about 500 nm. Suitable nano-graphene platelets for use in the present invention are commercially available from multiple domestic and international suppliers. The carbon black typically is in the range of about 100 nm or less. The exfoliated carbon nanofibers are typically less than about 50 nm. The exfoliated graphite is typically less than about 10 µm in length, with a thickness less than about 100 nm. The non-conductive nano-clays are typically less than about 10 nm. The conductive metallic additives are typically less than about 50 nm.

The carbon nanofibers preferably have a diameter of less than about one micrometer, or less than about 500 nm, or between about 50 and about 200 nm, or preferably a diameter of about 100 nm or less. The carbon nanofibers preferably have a length of about 200 micrometers or less and preferably a length of less than about 50 micrometers.

The carbon nanofibers comprise up to about 25 vol %, and preferably from about 0.5 to about 5 vol % of the mixture. The carbon nanofibers preferably comprise up to about 3 wt % of the mixture.

Preferred carbon nanofibers for use in the present invention are vapor grown carbon nanofibers having a graphitic nature. Suitable nanofibers include Pyrograf® III carbon nanofibers commercially available from Applied Sciences, Inc. and Pyrograf Products, Inc. The preferred carbon nanofibers are essentially comprised of a graphitic hollow tube, referred to as the catalytic phase of the carbon nanofiber, and having essentially no turbostratic or disordered carbon on the surface of the nanofiber. This type of nanofiber is preferred as it is highly electrically conductive and has a high surface area and surface energy.

The vapor grown carbon nanofibers are preferably heat treated prior to use in order to remove iron. Heat treatment is preferably performed in an inert atmosphere at a temperature above 700° C., and more preferably between about 1500° C. and 3,000° C.

Suitable polymeric matrix materials for use in forming the composite include, but are not limited to, polypropylene, thermoplastic olefins, nylon, and polycarbonate.

The polymer composite of the present invention may be formed by a direct melt mixing process that uses mixing (shear or chaotic) to blend the different components into a homogeneous compound. Melt mixing processes include, but are not limited to, continuous processes, for example, extrusion, and batch processes, such as a Banbury mixer. An example of a suitable extrusion method is the intermeshing co-rotating twin screw extruder equipped with appropriate mixing elements that promote dispersive mixing within the mixing process, which is beneficial for multi-scale reinforced compounds. The processing conditions should be such that low to medium shear mixing conditions should be achieved and applied to the constituents of the compound. The low to medium shear mixing conditions ensure the efficient dispersion of the multi-scale constituents while maintaining the geometric dimensions of the carbon nanofibers and nano-scale particles. Obtaining low to medium shear conditions typically involves using low or medium shear configurations of the mixing elements and low screw speeds. One of ordinary skill in the art would understand the conditions and how to obtain them.

The polymer may be supplied in pellet or powder form and melted in the mixing equipment, followed by gradual addition of the fiber and platelet materials to the mixing equipment containing the melted polymer. The resulting mixture is then blended by mixing.

If nano graphene platelets are used, they can be added with the polymer pellets or powder before the polymer is melted, or they can be added after the polymer is melted. If exfoliated platelets are used, they can be added after the polymer is melted. Any nano-scale particles which are fibers should be added after the polymer is melted. The carbon nanofibers should be added after the polymer is melted to avoid damage to the fibers. If both the carbon nanofibers and the nano-scale particles are added after the polymer is melted, they can be mixed together before adding them to the polymer, or they can be added sequentially.

Once the polymer compound has been mixed, it can be used in a high shear process, such as injection molding, without losing the improved conductivity.

Figure 2:
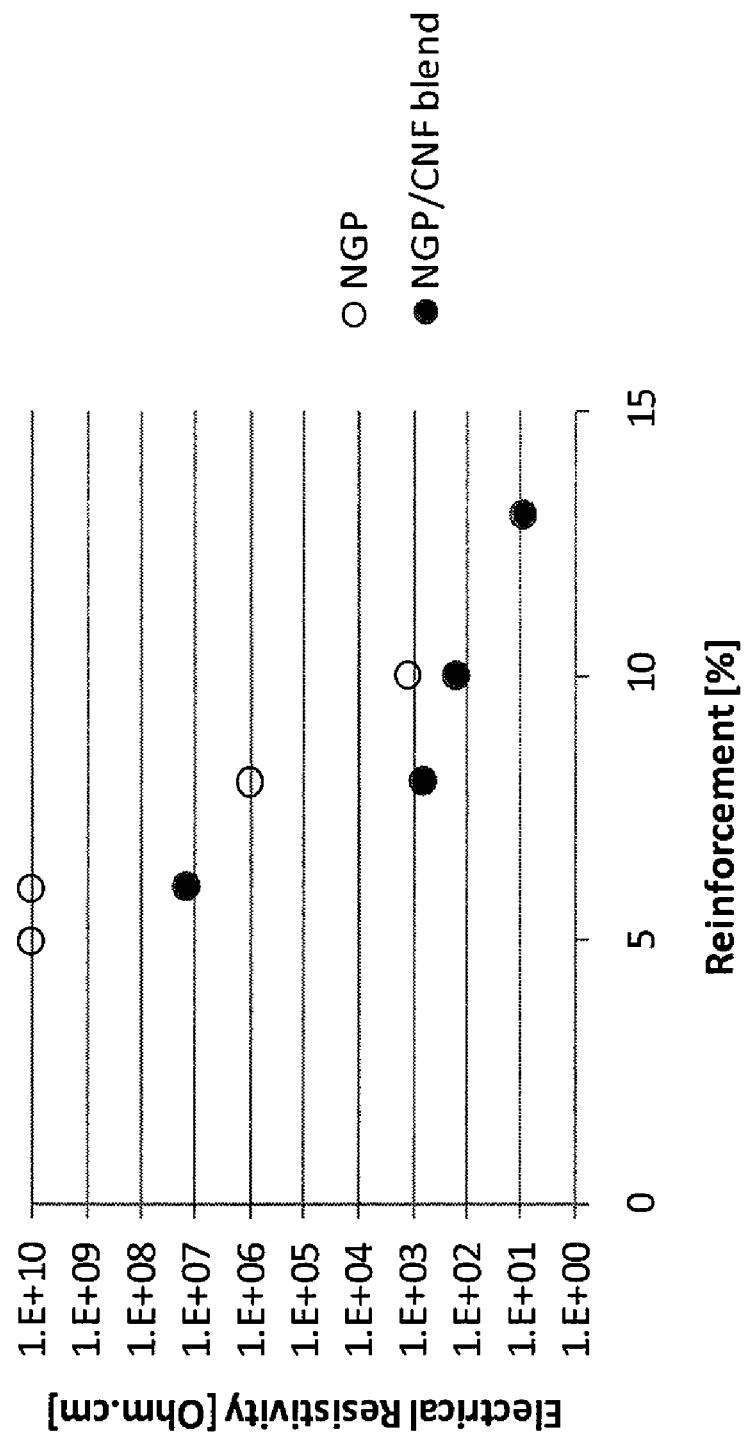
FIG. 2 is a graph illustrating the electrical resistivity of polymer composites reinforced with nano graphene platelets alone or in combination with carbon nanofibers.

Referring now to FIG. 2, electrical resistivity measurements are shown for the inclusion of nano-graphene platelets alone or in combination with carbon nanofibers in polypropylene. The materials were made using a CS-183 Minimax injection molder available from Custom Scientific Instruments Inc. The injection molder includes a cylindrical mixing cup and a rotating and vertically moving rotor for the mixing and injection. The polymer was supplied in pellet form and melted into the mixing cup, followed by gradual addition of the fiber and platelet materials to the mixing cup containing the melted polymer. The nano-graphene mixture contained the amounts of nano-graphene platelets show in FIG. 2. The combined mixture contained about 1 wt % carbon nanofibers with the remainder of the reinforcement being nano-graphene platelets as shown in FIG. 2. The resulting mixing was blended by low shear mixing and then injected into a heated mold.

As can be seen, for low reinforcement percentages, the introduction of carbon nanofibers shifts the percolation threshold to a lower concentration in comparison with mixtures containing only nano-graphene platelets. It can also be seen that the carbon nanofiber/nano-graphene platelet blend results in lower electrical resistivity values.

Having described the invention in detail and by reference to preferred embodiments thereof, it will be apparent that modifications and variations are possible without departing from the scope of the invention.

What is claimed is:

1. A method of making a polymer composite comprising:
providing carbon nanofibers having a diameter of less than about one micrometer;
providing nano-scale particles which are shorter in length than the carbon nanofibers, the nano-scale particles selected from nano-scale carbon additives, non-conductive nano-clays, nano-scale conductive metallic additives, or combinations thereof; and
mixing the carbon nanofibers and the nano-scale particles with a polymer to form a homogeneous polymer composite;
wherein a total amount of carbon nanofibers and nano-scale particles is less than about 1.5 wt %, and wherein the polymer composite has a resistivity of less than about $1 \times 10^7$ Ohm-cm.

2. The method of claim 1 wherein the carbon nanofibers have a length of less than about 200 micrometers.

3. A homogeneous polymer composite comprising:
carbon nanofibers having a diameter of less than about one micrometer;
nano-scale particles selected from nano-scale carbon additives, non-conductive nano-clays, nano-scale conductive metallic additives, or combinations thereof; and
polymer;
wherein the homogeneous polymer composite has a resistivity of less than about $10^7$ ohm-cm, and wherein a total amount of carbon nanofibers and nano-scale particles is less than about 1.5 wt %.

4. The homogeneous polymer composite of claim 3 wherein the carbon nanofibers have a length of less than about 200 micrometers.

5. The method of claim 1 wherein the nano-scale particles have a length less than about 1000 nm.

6. The method of claim 1 wherein the nano-scale particles are nano-graphene platelets.

7. The method of claim 1 wherein the mixing is shear mixing or chaotic mixing.

8. The method of claim 7 wherein the mixing is shear mixing selected from low shear mixing or medium shear mixing.

9. The method of claim 1 wherein the mixing is performed by extrusion.

10. The method of claim 1 further comprising molding the polymer composite to form a polymer composite article using a high shear process.

11. The method of claim 1 wherein the nano-scale carbon additives are selected from carbon black, exfoliated carbon nanofibers, exfoliated graphite, nano-graphene platelets, and combinations thereof.

12. The method of claim 1 wherein the polymeric material is selected from polypropylene, thermoplastic olefins, nylon, polycarbonate, or combinations thereof.

13. A method of making a polymer composite comprising:
providing carbon nanofibers having a diameter of less than about one micrometer;
providing nano-scale carbon additives which are shorter in length than the carbon nanofibers, the nano-scale carbon additives selected from carbon black, exfoliated carbon nanofibers, exfoliated graphite, nano-graphene platelets, and combinations thereof
shear mixing the carbon nanofibers and the nano-scale carbon additives with a polymer to form a homogeneous polymer composite;
wherein a total amount of carbon nanofibers and nano-scale carbon additives is less than about 1.5 wt %, and wherein the polymer composite has a resistivity of less than about $1 \times 10^7$ Ohm-cm.

14. The method of claim 1 wherein the carbon nanofibers have a length of less than about 200 micrometers.

15. The method of claim 13 wherein the nano-scale particles are nano-graphene platelets.

16. The homogeneous polymer composite of claim 3 wherein the nano-scale particles are nano-graphene platelets.

17. The method of claim 1 wherein the nano-scale carbon additives have a length less than about 1000 nm.

* * * * *